Nov. 18, 1941.    F. M. DESSART    2,262,992
MASQUERADE, CARNIVAL, OR PARTY MASK
Filed Oct. 18, 1939
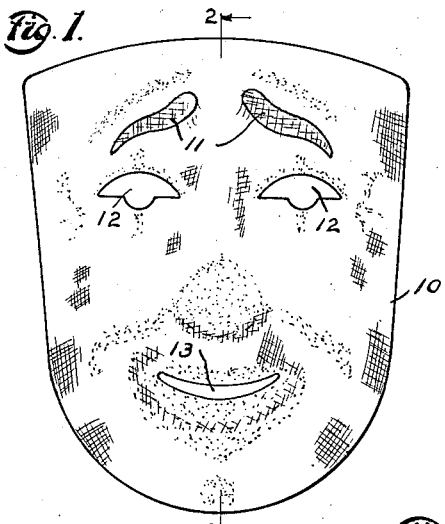
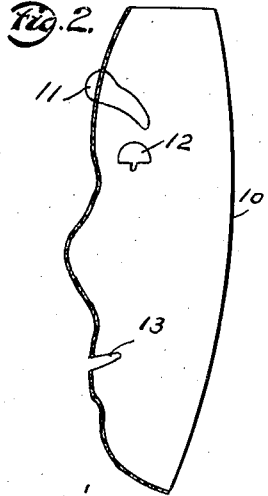
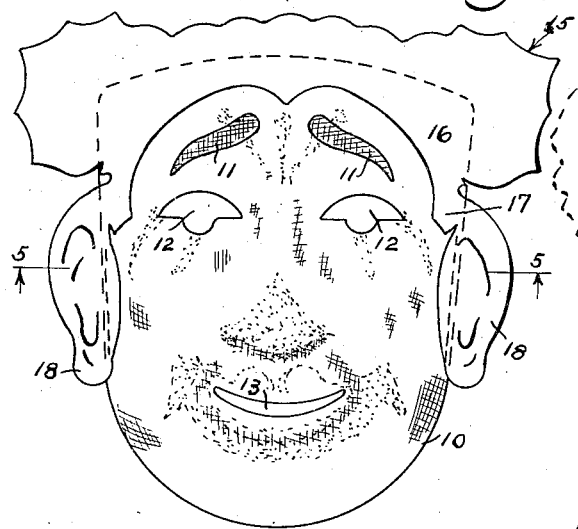
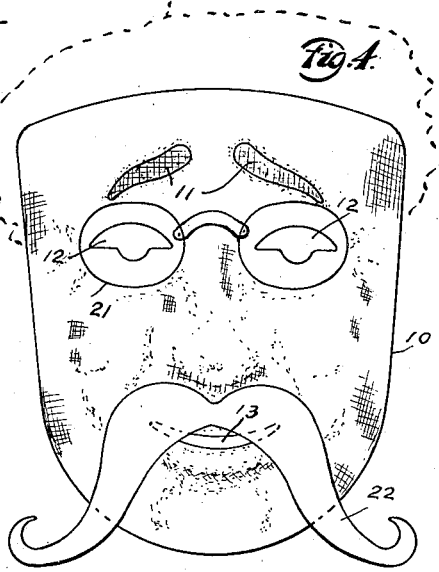
INVENTOR;
Franklyn M. Dessart,
BY
Harold W. Jenne, ATTORNEY.

Patented Nov. 18, 1941

2,262,992

UNITED STATES PATENT OFFICE 2,262,992

MASQUERADE, CARNIVAL, OR PARTY MASK

Franklyn M. Dessart, New York, N. Y.

Application October 18, 1939, Serial No. 300,026

1 Claim. (Cl. 2—206)

This invention relates to face masks and more particularly to masquerade, carnival or party masks, though it is noted that the invention is not limited to these uses.

One object of the invention is to provide improved masks whereby very striking effects may be easily and cheaply obtained.

Other objects are to provide appliques adapted to be easily applied to contoured face masks for representing hair, ears and other features.

Other objects of the invention are to provide a set of variously colored and shaped face masks and appliques, whereby face masks and appliques may be assembled in different combinations to provide a wide variety of masks of widely differing appearance.

Another object is to provide a suitable applique which will allow the masks to be nested for storage or shipping.

Additional objects of the invention are to effect variety with simplicity and individuality in such masks and to provide an extremely simple mask of this kind which is of striking and individual appearance, and economical to manufacture and assemble.

Still other objects of the invention will appear as the description proceeds; and while herein details of the invention are described in the specification and claim, the invention as described in the claim is not limited to these, and many and various changes may be made without departing from the scope of the invention as claimed.

The inventive features for the accomplishment of these and other objects are shown herein in connection with several face masks and an assembly which briefly stated, includes a face mask having eye and mouth cut-outs and contoured to simulate features of the face to which is applied an applique to simulate hair over the forehead and temples and having out-turned ears joining the hair, the front of each ear having a rear tab secured to the cheek of the mask for holding the applique in place. As shown the applique and the face masks are provided with contrasting markings to simulate shadows and to give grotesque appearance and individuality to the mask.

In the accompanying drawing showing, by way of example, several of many possible embodiments of the invention:

Fig. 1 is a front elevation of a face mask without the applique;

Fig. 2 is a sectional view taken on the line 2—2 of Fig. 1;

Fig. 3 is a front elevation showing a face mask with an applique applied;

Fig. 4 is a front elevation showing a face mask having cut-out eye-glasses and moustache adhered thereto, the applique being dotted to represent any one of many forms of applique that may be used; and Fig. 5 is a sectional view taken on the line 5—5 of Fig. 3.

My masks are particularly suitable for masquerade, carnival and party goods and may be conveniently nested for storage and shipment.

In the drawing several masks are shown and these may be similarly or differently contoured and have various designs and markings thereon.

As shown each mask comprises a face mask 10 of gauze, buckram or other material sized, pressed and dried to a contour simulating all or several of the features of the face, except the ears and hair, and including the nose, eye-brows 11, cheeks, lips, chin and temples, and having cut-outs 12, 13 simulating the eye and mouth openings.

For application to any of the face masks I provide a plurality of appliques, such as the effect-changing finishing blank or applique 15 of flat or embossed paper or flat or embossed gauze, buckram or other suitable material of a contrasting color to the mask, and cut to an outline simulating hair 16 at and above the forehead and down along the temples of the face mask, as at 17, and ears 18 integrally joining the hair below the temple.

Said applique or blank is curved over the forehead and laid on the temples, and is provided just frontward of each ear 18 with a long narrow tab 20 having a side margin integrally joining the ear. Said tab 20 (Fig. 5) is folded rearwardly and adhered along the margin of the face mask to the rear of the cheek, the ears being bent outwardly to lie substantially in the same plane with each other.

The appliques 15 and the face masks 10 are painted or otherwise provided with markings to simulate the appearance of wrinkles and shadows, and with markings to give a grotesque or clownish appearance to the masks. The masks may be sold in sets in which the markings and colors of the markings, the appliques and the face masks are widely different in appearance, and are combined in different combinations thus to give individuality and a very wide variety to the masks of the set. The face mask may be used without the applique. The variety may be further increased by providing cut-out paper eye-glasses 21 and a moustache 22 adhered respectively on the eyes and upper lip of the face mask. These may be painted on if desired.

The face masks 10 may be nested for shipping and storage, and the appliques may be shipped flat, for later assembly by the dealer or purchaser. The completely assembled masks may also be conveniently nested.

From the above it is seen that a very large variety of masks may be made from a small number of stock forms and blanks.

The applique 15' (Fig. 4) is shown in dotted lines to indicate that the appliques may be provided in a great variety of designs. The parts 10, 15, 21 and 22 may be assembled before sale, or may be sold separately and assembled in various combinations by the user. The parts 15, 21 and 22 may be applied by any suitable adhesive, or by a non-transferring adhesive permitting the applied part to be removed and applied to other face masks if desired.

The invention claimed is:

In a face mask, a body of stiff material shaped to generally present a simulation of a human face except for hair and ears, and a supplementary strip for simulation of hair and the like and for simulation of ears, said supplementary strip comprising an arched central portion extending across the brow portion and down the temple portions of the body and adhered thereto, said supplementary portion having ear portions at its ends provided with long narrow tabs adhesively secured to the body and joined to the cheek sections by rearwardly turned brace portions for holding the ear portions in projecting relation to the body.

FRANKLYN M. DESSART.